United States Patent [19]

Friedericy et al.

[11] Patent Number: 4,458,400
[45] Date of Patent: Jul. 10, 1984

[54] COMPOSITE MATERIAL FLYWHEEL HUB

[75] Inventors: Johan A. Friedericy, Palos Verdes Estates; Dennis A. Towgood, Huntington Beach, both of Calif.

[73] Assignee: The Garrett Corporation, Los Angeles, Calif.

[21] Appl. No.: 253,413

[22] Filed: Apr. 13, 1981

Related U.S. Application Data

[62] Division of Ser. No. 78,981, Sep. 26, 1979, Pat. No. 4,286,475.

[51] Int. Cl.$^3$ .............................................. B23P 15/14
[52] U.S. Cl. .................................. 29/159.3; 29/159 R
[58] Field of Search .......... 74/572; 29/159 R, 159.02, 29/159.03, 159.3; 264/257, 258; 156/180

[56] References Cited

U.S. PATENT DOCUMENTS

| | | | |
|---|---|---|---|
| 683,832 | 10/1901 | Baker | 29/159.02 |
| 2,602,766 | 7/1952 | Francis | 264/257 |
| 3,674,581 | 7/1972 | Kalnin et al. | 156/180 |
| 4,123,949 | 11/1978 | Knight, Jr. et al. | 74/572 |
| 4,154,634 | 5/1979 | Shobert et al. | 264/258 |

Primary Examiner—Lowell A. Larson
Attorney, Agent, or Firm—Terry L. Miller; Albert J. Miller

[57] ABSTRACT

Unidirectional fiber-reinforced matrix material bars are stacked to form a lightweight, high strength hub for a composite material flywheel.

13 Claims, 6 Drawing Figures

U.S. Patent  Jul. 10, 1984  4,458,400
Fig. 1.
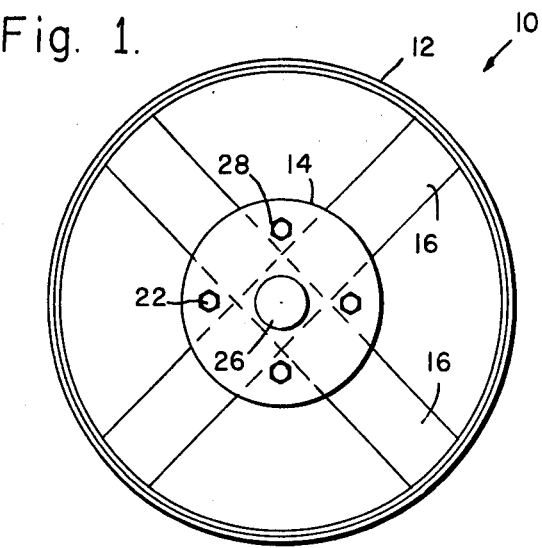
Fig. 4.
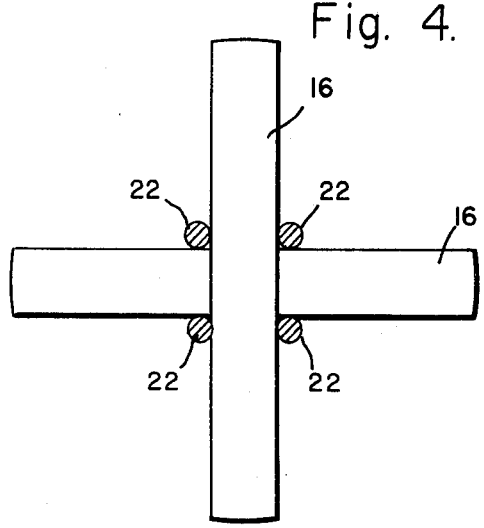
Fig. 2.
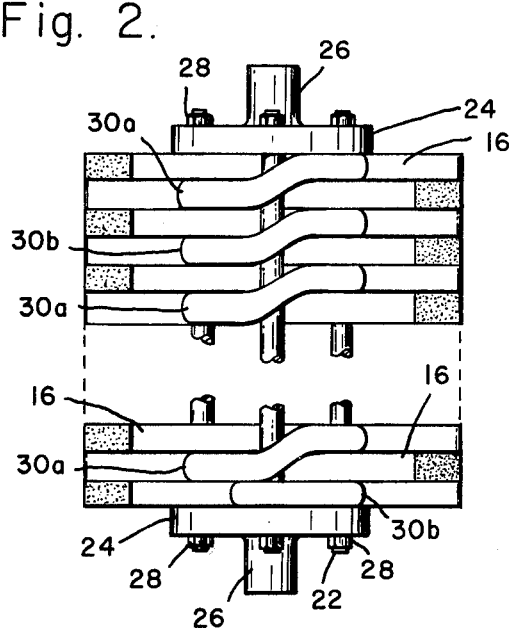
Fig. 3.
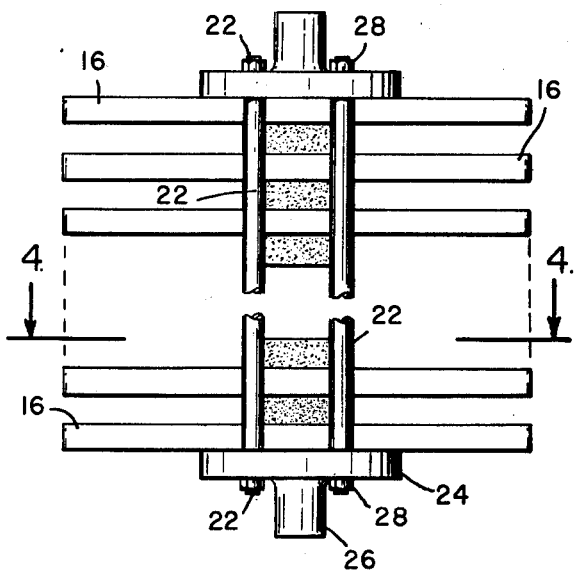
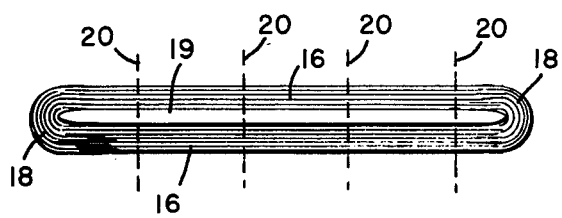
Fig. 5.
Fig. 6.
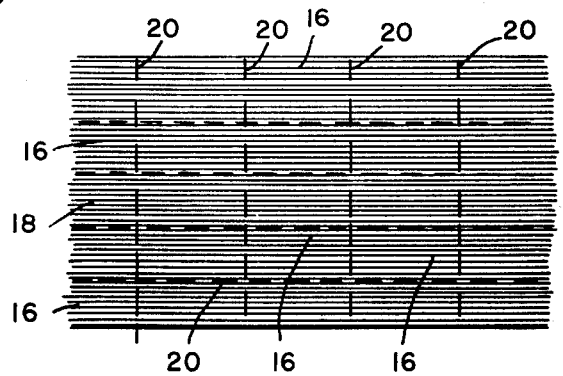

COMPOSITE MATERIAL FLYWHEEL HUB

This is a divisional of application Ser. No. 78,981 filed Sept. 26, 1979, now U.S. Pat. No. 4,286,475 granted Sept. 1, 1981.

This invention relates to flywheels and, more particularly, to an improved flywheel hub construction wherein lightweight, high strength composite material bars are formed in a supporting structure for the rims of a lightweight composite material flywheel.

Although flywheels have long been well-known as devices for storage of mechanical energy, the interest in such devices has recently increased greatly. Energy supplied to the shaft of a flywheel is stored through an increase in the rotational velocity of the flywheel. If the flywheel shaft is coupled through a suitable clutch to a mechanical engine or connected to a generator, useful mechanical or electrical energy can be released. Such flywheels have been found to be extremely useful in preventing energy waste such as that which normally occurs when vehicles are stopped by friction braking. The energy which would otherwise be dissipated as heat can be stored in the flywheel through regenerative braking and used to help accelerate the vehicles.

Flywheels have long been manufactured of heavy isotropic materials such as steel, either in solid or laminated constructions. It was believed that the high mass of such a flywheel would permit the greatest amount of energy storage by allowing the maximum kinetic energy to exist therein. More recently, however, it has been found to be desirable to manufacture flywheels with a rim construction of a wound fiber, such as fiberglass or Kevlar, in an epoxy matrix. A successful example of such a flywheel is shown in our U.S. Pat. No. 4,036,080 issued on July 19, 1977.

Although lightweight flywheels of this type have their energy storage capability reduced because of their lower mass as compared with steel flywheels, these lightweight flywheels have a substantial advantage in that they are capable of safe operation at extremely high rotational velocities. Because kinetic energy storage is not only proportional to mass but is also proportional to the square of the velocity, these high velocities enable the flywheels to attain energy storage levels comparable to more massive flywheels. Further, because of the layered composite material rim construction, destruction of such a flywheel, even at high velocity, would result in a more gradual disintegration of the wheel then would be the case with metallic solid disc flywheels. Thus, lightweight containment materials, may safely be used. Comparable flywheels of heavy isotropic material can propel large chunks of material such as steel upon destruction. This requires much more massive containment devices.

The utilization of lightweight, high strength materials throughout the flywheel construction is necessary to provide the desired high rotational velocity. However, while it has been possible to construct a rim assembly having high circumferential strength characteristics out of composite materials, it has been necessary to utilize light metals, such as aluminum, for the hub so that the high radial strength requirement could be maintained. While aluminum is a very light metal, it was desirable to find an even lighter material which could permit even high tip speeds to be attained for comparable energy storage capacity with less rotor mass while providing the necessary structural characteristics.

In accordance with this invention, a flywheel hub is constructed of bars formed of a matrix material reinforced with unidirectional fibers. The bars are bonded together in a crosswise pattern in which the bars are alternately placed at right angles to each other. The stack is further locked together, such as by tie bolts which may in turn be lashed up by means of coated reinforcing wire to prevent the bolts from bowing in an outward direction due to centrifugal force resulting from the high rotational velocity of the flywheel.

This novel manner of hub construction provides a device which is of sufficient strength to maintain its structural integrity at high speed while being lighter in weight than previously used light metal hubs. While fiber/epoxy composites lack the overall strength of light metals, the unidirectional alignment of the fibers provide sufficient strength in the radial direction to enable the hub to withstand full design loads.

The advantages of this invention may be better understood when the following detailed description is read in conjunction with the appended drawings, wherein:

FIG. 1 is an end plan view of a flywheel constructed in accordance with this invention;

FIG. 2 is a side plan view of the flywheel of FIG. 1 with the rims thereof removed;

FIG. 3 is a view similar to but rotated from the viewing angle of FIG. 2 and with rims and lashing means of the flywheel removed;

FIG. 4 is a cross section view taken along the line 4—4 of FIG. 3; and

FIGS. 5 and 6 are plan views showing alternative steps in the construction of the hub of this invention.

Referring now to the drawings, FIG. 1 illustrates a flywheel 10 comprising rim means 12 mounted on a hub 14. The rim means 12 may be of any desired configuration but is preferably fiber material, such as fiberglass, which is wound circumferentially and embedded in a matrix material such as an epoxy resin. Such a rim construction yields high circumferential strength which is required for the rim. Depending upon thickness, the rim 12 may be unitary or segmented and may be round or be mounted in a non-circular configuration such as is disclosed in the aforementioned U.S. Pat. No. 4,036,080.

The hub 14 is formed of a plurality of bars 16 mounted together in a manner to be described. Each bar 16 consists of unidirectional laid up or wound fibers which are embedded in a reinforcing matrix. In the preferred embodiment, these bars are made up of fiberglass reinforced epoxy material. However, if desired, other fibers, such as Kevlar-29, Kevlar-49 or various high strength graphites, such as Thornel 300, may be utilized. The resin known as Dow Corning DER332 epoxy is preferred for use as the matrix material.

One manner of manufacture of such bars is illustrated in FIG. 5 wherein filamentary material 18 is wound over a flat sided mandrel 19 in a configuration wherein the portions of the fibers between the ends are unidirectional. These unidirectional fibers are then embedded in epoxy. After curing, the construction is cut as shown by the dashed lines 20 for the purpose of forming bars 16.

FIG. 6 illustrates an alternate method for constructing the bars whereby filaments are laid down in a unidirectional configuration, an epoxy matrix applied and the system cured under pressure in a mold or autoclave. Cutting along the dashed lines 20 forms the bars 16 in the desired shape and size. It will be understood that whether the construction method of FIG. 5 or FIG. 6 is utilized, rounding of the ends or other forming of the bars 16 may be required for use in the hub 14.

No matter how the bars 16 are constructed, they will be oriented so that the fibers run longitudinally. The bars 16 are then stacked in the manner shown in FIGS. 3 and 4 such that each bar is stacked at a right angle to the bar immediately below it. In this manner, the form of hub is structured, each spoke having the filaments thereof radially aligned. The bars 16 may then be bonded together by a suitable means such as with a controlled glue line bonding agent. This bonding agent must be sufficiently flexible to allow for outward growth of the bars relative to each other when subjected to a centrifugal force field during rotation.

The integrity of the assembly may be further assured by the use of a plurality of tie bolts 22. The tie bolts 22 are preferably positioned at the corners formed by the adjacent bars 16 and additionally serve to connect end plates 24 at opposite ends of the hub 14. Each end plate 23 may have an axle portion 26 extending therefrom which may be mounted on suitable bearings and connected to an input/output shaft for carrying energy to and from the flywheel 10. The end plates are secured to the bars 16 by using suitable nuts 28 threaded onto end portions of the tie bolts 22.

As previously described, during operation the lightweight flywheel 10 operates at a very high rotational velocity, typically on the order of 2500 ft./sec. As a result of the substantial degree of centrifugal force at such velocities, the central portion of each tie bolts 22 may be forced outward causing the tie bolts to bow. The end plates 24 could then be drawn inwardly along the rotational axis of the flywheel, possibly seriously affecting the flywheel performance. To prevent this bowing, lashing means 30, which is preferably high strength fiber ropes impregnated with epoxy but may also be either an epoxy or phenolic or polyimide coated reinforcing wire or yarn, will be wound around the tie bolts 22. Two of these lashing means 30a and 30b are wound on opposite sides of the hub 14 to fully surround the tie bolts 22. The lashing means are woven around the bolts and between the bars 16. As a result, the lashing means become stepped in the manner illustrated in FIG. 2 around the axis of the hub. After final tightening of the nuts 28, the entire assembly may then be cured to produce a solid, secure and lightweight hub assembly. If necessary, the outer ends of each of the bars may be sanded or otherwise shaped for uniformity and the rim 12 bonded or wound on to form the flywheel 10.

If the rim means 12 is mounted in the preferred noncircular configuration as described in our aforementioned U.S. Pat. No. 4,036,080, the bars 16 must withstand a radial inward force of about 4–5,000 lb./lined inch of rotor length when the flywheel is operating. The use of the tie bolts 22 and lashing means 30 provides structural integrity for the hub 14 under these conditions while the radial alignment of the filaments permits the bars 16 to easily handle these forces.

We claim:

1. A method of constructing a flywheel, said method comprising the steps of:

forming a plurality of bar means having substantially uniform cross section of filamentary material embedded in a matrix with the filamentary material generally longitudinally aligned;

stacking a plurality of said bar means with central portions of each bar means engaging its adjacent bar means and with the filamentary material of adjacent bar means substantially at right angles to each other;

securing said stacked bar means in a unitary structure; and mounting rim means on ends of said stacked bar means.

2. A method of constructing a flywheel hub, said method comprising the steps of:

forming a plurality of bar means having substantially uniform cross section of filamentary material embedded in a matrix with the filamentary material generally longitudinally aligned;

stacking a plurality of said bar means with central portions of each bar means engaging its adjacent bar means and with the filamentary material of adjacent bar means substantially at right angles to each other; and securing said stacked bar means in a unitary structure.

3. The method of claim 1 or 2 wherein the step of forming said bar means comprises:

winding filamentary material with an elongated portion in generally parallel orientation;

embedding said filamentary material in a matrix; and cutting said matrix embedded filamentary material with said filamentary material longitudinally aligned.

4. The method of claim 3 including the additional step of trimming end portions of said bar means into arcuate shape.

5. The method of claim 1 or 2 wherein the step of forming said bar means comprises:

positioning filamentary material in generally parallel orientation;

embedding said filamentary material in a matrix; and cutting said matrix embedded filamentary material with said filamentary material longitudinally aligned.

6. The method of claim 5 including the additional step of trimming end portions of said bar means into arcuate shape.

7. The method of claim 1 or 2 wherein the step of securing said stacked bar means comprises:

positioning end plate means at opposed axial ends of said stacked bar means; and inwardly biasing said end plate means.

8. The method of claim 7 wherein said end plates are inwardly biased by bolts connected therebetween.

9. The method of claim 8 including the additional step of securing lashing means around said bolts and between said bar means.

10. The method of claim 9 including the step of curing said stacked and secured bar means.

11. The method of claim 1 or 2, wherein said filamentary material comprises a fiber selected from the group consisting of fiberglass, Kevlar and high strength graphite.

12. The method of claim 11 wherein said matrix material comprises an epoxy resin.

13. The method of claims 1 or 2, wherein said matrix material comprises an epoxy resin.

* * * * *